United States Patent Office 2,990,413
Patented June 27, 1961

2,990,413
PROCESS FOR THE PRODUCTION OF DYE-
STUFFS FOR SYNTHETIC FIBERS
Günter Gehrke, Leverkusen-Bayerwerk, Germany, assignor to Farbenfabriken Bayer Aktiengesellschaft, Leverkusen, Germany, a corporation of Germany
No Drawing. Filed Sept. 23, 1958, Ser. No. 762,678
Claims priority, application Germany Mar. 7, 1955
5 Claims. (Cl. 260—380)

This invention relates to novel dyestuffs of the anthraquinone series.

It is an object of the present invention to provide novel dyestuffs of the anthraquinone series with good fastness properties. A further object is to provide novel dyestuffs for the dyeing of synthetic fibers with a good fastness to light and a good affinity for said fibers. Still another object is to provide dyestuffs for the dyeing of polyester fibers. Further objects will appear hereinafter.

These objects are attained in accordance with the present invention by treating anthraquinones substituted in the four α-positions by amino and hydroxy groups such as the 4,8-diamino-1,5-dihydroxy-, 4,5-diamino-1,8-dihydroxy-, 5,8-diamino-1,4-dihydroxy-, 4,5,8-triamino-1-hydroxy- or 8-amino-1,4,5-trihydroxy anthraquinones with halogenating agents. As halogenating agents there may be used halogens such as chlorine or bromine and halogen-yielding compounds such as sulfuryl chloride.

The process of the present invention may, for instance, be carried out by introducing the aforesaid anthraquinones into diluted or concentrated or slightly fuming sulfuric acid, into concentrated hydrohalic acid or into inert organic solvents as, for example, halo- or nitrobenzenes, glacial acetic acid or glycol monoethyl ether and by subsequently adding a halogen or halogenating compound such as sulfuryl chloride. It is expedient to effect the halogenation at a slightly elevated temperature for example at temperatures up to about 100° C. From the reaction mixture the dyestuff formed can be obtained in known manner.

If necessary, boric acid and catalysts conventionally used in halogenation such as iodine, may be added to the reaction mixture. Furthermore it is possible to carry out the halogenation stepwise, whereby also different halogens can be used for the halogenation.

In addition to 4,8-diamino-1,5-dihydroxy- or 4,5-diamino-1,8-dihydroxy-anthraquinone, there may also be used for the process according to the invention disulfonic acids of these anthraquinones from which the two sulfoacid groups have been previously split off by heating in sulfuric acid in the presence of reducing agents, in analogy to the process disclosed in German patent specification No. 190,476. The subsequent halogenation may then be effected in the same reaction mixture. The 5,8-diamino-1,4-dihydroxy-, 4,5,8-triamino-1-hydroxy- or 8-amino-1,4,5-trihydroxy-anthraquinones can be obtained from 1,4,5,8-tetrahydroxy or 1,4,5,8-tetraamino anthraquinones in which a corresponding number of hydroxy or amino groups have been replaced respectively by amino or hydroxy groups. In some cases mixtures are thus obtained which can be used according to the process of the present invention without necessity for isolation of the pure compounds. The processes for producing these compounds are described in, for example, German patent specification Nos. 205,149, 554,647, 556,459, 579,841, and 594,721.

The compounds obtained according to the present invention are dyestuffs for synthetic fibers, which are very fast to light. Whilst for example the unhalogenated 4,8-diamino-1,5-dihydroxy- and the 8-amino-1,4,5-trihydroxy anthraquinone have only a slight affinity for synthetic fibers, the dyestuffs produced according to the new process by halogenation which are mixtures of unhalogenated anthraquinones and anthraquinones with a different degree of halogenation—preferably mono—and dihalogenated anthraquinones which can contain also a minor amount of higher halogenated anthraquinones—surprisingly possess in addition to a very good fastness to light a good affinity for the fibers. With increasing halogen content the shade of the dyestuffs obtained according to the invention becomes more greenish and the fastness to subliming on polyester fibers is improved, whilst the affinity for the fibers decreases again with increasing halogen content.

While dyestuffs with a bromine content of 5–40% or a chlorine content of 3–25% can be used in principle for the dyeing of synthetic fibers, the dyestuffs have the best dyeing properties with an average halogen content of about 0.75–1.25 atoms of the halogen based on the anthraquinones. If the halogen content is too high or too low the dyestuffs lose their good properties. Dyestuffs with an average halogen content between 0.5–1.5 mols based on the anthraquinones have sufficient satisfying properties.

The novel dyestuffs can be used for the dyeing of the various synthetic fibers by the methods usually applied for the dyeing of such fibers. Preferably, the dyestuffs are used in finely devided dispersions under addition of dispersing agents. Polyester fibers such as Dacron, Terylene or Diolen can be dyed in the usual manner e.g. from a boiling dye bath which may contain, if desired, the usually applied carriers, or at temperatures of about 100° C. under pressure.

Thus, strong blue dyeings of excellent fastness properties are obtained. Fibers of triacetyl cellulose such as Arnel, Courpleta or Tricel can be dyed by using the same methods. From a boiling dye bath on polyamide fibers such as Nylon or Perlon, dyeings of medium to strong shades are obtained with excellent fastness properties, while polyacrylonitrile fibers, e.g. Orlon or Dralon are dyed in pastel shades. Excellent dyeings are obtained as well by using copolymers e.g. from acrylonitrile and vinylchloride or vinylacetate or vinylidine chloride and vinyl chloride such as Acrilan, Dynel or Saran.

This application is a continuation-in-part application of our copending application Serial No. 568,161, filed February 28, 1956, now abandoned.

The following examples are given for the purpose of illustrating the invention without in any way limiting it thereto, the parts being by weight.

*Example 1*

43 parts of 4,8-diamino-1,5-dihydroxy-anthraquinone-2,6-disulfonic acid (or the corresponding quantity of the sodium salt) are introduced into 500 parts of 96 percent sulfuric acid and 10 parts of boric acid and 25 parts of water are then added to the mixture. About 3 parts of stannous chloride are added in small portions at 150° C. until the two sulfo groups are split off and a sample fails to dissolve in aqueous pyridine. After the addition of 0.5 part of iodine, 30 parts of bromine are run into the mixture of 50° C. and stirring is continued at 50° C. until a sample contains 28–30 percent of bromine. The mixture is then put into ice water containing a little bisulfite solution, the precipitate is filtered off by suction and washed until neutral. About 38 parts of a dyestuff are thus obtained which dyes synthetic fibers in clear blue shades.

One part of this dyestuff is dispersed in 5000 parts of water and heated to 30–50° C. Thereafter 150 parts of a polyester fiber are introduced and the temperature is raised within 20 minutes to 120° C. The dyeing is carried out at this temperature for one hour yielding a clear blue dyeing of excellent fastness properties. If the dyeing process shall be carried out at 100° C., advantageously a usually applied carrier is added to the dye bath or the dyeing process is carried out over a longer period. Similar dyeings are obtained by using fibers of triacetyl cellulose, polyamides and copolymers.

A similar dyestuff is obtained from 4,5-diamino-1,8-dihydroxy-anthraquinone-2,7-disulfonic acid. Instead of stannous chloride there may be used for the splitting off of the sulfo groups other reducing agents such as metals, phenols, amines, sugar, or leuco-compounds of the amino-hydroxy-anthraquinone sulfonic acid employed.

*Example 2*

27 parts of 4,8-diamino-1,5-dihydroxy-anthraquinone and 10 parts of boric acid are dissolved in 250 parts of sulfuric acid monohydrate and 0.1 part of iodine and 10 parts of bromine are added thereto. The mixture is then stirred at 50° C. until the bromine is used up. The reaction mixture is then pressed onto ice, the precipitate is filtered off by suction and washed neutral. 35 parts of a blue dyestuff are thus obtained which contains about 25 percent of bromine.

With the dyestuff thus obtained triacetyl cellulose can be dyed by introducing 150 parts of triacetyl cellulose into a dye bath consisting of one part of the dyestuff dispersed in the presence of a dispersing agent in 6000 parts of water at 40–50° C. The temperature is raised within 30–40 minutes to 95–98° C. After dyeing for 1–2 hours at 95–98° C. a clear blue dyeing with excellent fastness properties is obtained. If desired, a usually applied carrier can be added to the dye bath.

When using only 7 parts of bromine, 32 parts of a dyestuff are obtained which contains 18–20 percent of bromine and when using 5 parts of bromine a dyestuff is obtained containing 13% of bromine.

By using this dyestuff in the manner described above for the dyeing of triacetyl cellulose, dyeings with a slightly more reddish shade are obtained. In the same manner fibers of polyesters, polyamides and copolymers can be dyed. By dyeing 150 parts of polyacrylonitrile fibers in the process described above with 0.2 part of the dyestuff, a light blue dyeing with excellent fastness properties is obtained.

Similar dyestuffs are obtained when brominating 4,5-diamino-1,8-dihydroxy-anthraquinone instead of 4,8-diamino-1,5-dihydroxy-anthraquinone.

*Example 3*

27 parts of 4,8-diamino-1,5-dihydroxy-anthraquinone are introduced into 150 parts of concentrated hydrochloric acid. 200 parts of a 10 percent bromine solution in concentrated hydrochloric acid are then run into the mixture and the whole is stirred at 50° C. until no further free bromine can be detected. Thereupon the product is filtered off by suction and the residue washed neutral. 33 parts of the halogenated product are thus obtained. The dyestuff contains mainly bromine besides chlorine, the halogen content being 25 percent calculated on bromine.

*Example 4*

27 parts of 4,8-diamino-1,5-dihydroxy-anthraquinone, 7 parts of boric acid and 1 part of iodine are dissolved in 250 parts of a 92 percent sulfuric acid. At 50° C. chlorine is introduced into the solution until a sample contains 20–21 percent of chlorine. After working up according to Example 1, 32 parts of a blue dyestuff are obtained. Similar dyestuffs are obtained if such an amount of chlorine is introduced that the dyestuffs obtained have a chlorine content of 6 percent, 11 percent or 16 percent.

*Example 5*

27 parts of a 4,5-diamino-1,8-dihydroxy-anthraquinone are introduced into 200 parts of nitrobenzene, 0.1 part of iodine is added thereto and 33 parts of bromine are run into the mixture at 50° C. The whole is stirred at 50° C. for a further 3 hours, the nitrobenzene is driven off with steam, and a product is obtained containing about 37 percent of bromine.

*Example 6*

27 parts of 4,8-diamino-1,5-dihydroxy-anthraquinone are treated in 200 parts of o-dichlorobenzene with 20 parts of sulfuryl chloride. The mixture is stirred for an hour at 60° C. after cooling filtered off by suction, and the residue is washed with methanol and water. After drying, a dyestuff is obtained containing about 13 percent of chlorine.

*Example 7*

27.1 parts of 8-amino-1,4,5-trihydroxy-anthraquinone produced according to the process of German patent specification No. 556,459 and 13.5 parts of boric acid are dissolved in 270 parts of sulfuric acid monohydrate, and 0.1 part of iodine and 20 parts of bromine are then added. The mixture is stirred at 50° C. until a tested sample shows a content of about 20 percent of bromine. The reaction mixture is then poured onto ice. The precipitate formed is filtered off and washed till neutral.

A dye-bath is prepared by dispersing 1 part of the dyestuff in 3000 parts of water. 100 parts of a polyester fiber are dyed from this dye-bath for one hour at 120° C. under pressure. There is obtained a strong reddish blue dyeing having excellent fastness properties. If the dyeing is carried out under normal pressure at the boiling temperature of the dye-bath a usual carrier has to be added such as benzoic acid or p- or o-hydroxydiphenyl.

If the bromination of the anthraquinone is carried out with 30 parts of bromine and if the mixture is worked up, if a tested sample shows a content of 28–30 percent bromine, a dyestuff is obtained from which a dyeing with a somewhat more greenish shade is obtained. If the bromination is carried out with only 10 parts of bromine and if the dyestuffs obtained have a bromine content of 8–10% a somewhat more reddish dyestuff is obtained.

If the bromination is carried out in the same manner but using 4,5,8-triamino-1-hydroxy-anthraquinone or 5,8-dihydroxy-1,4-diamino-anthraquinone of mixtures of these anthraquinones clear blue dyestuffs are obtained.

Instead of the polyester fibers there can be used also fibers of polyamides, polyvinylidinechloride, polyacrylonitrile or copolymerisates of acrylonitrile and vinylacetate or copolymerisates obtained from vinylidine chloride and vinylchloride.

*Example 8*

26.9 parts of 3,5,8-triamino-1-hydroxy-anthraquinone produced according to the process of German patent specification No. 594,721, and 0.1 part of iodine are introduced into 200 parts of nitrobenzene. At a temperature of 50° C. 20 parts of bromine are added while stirring. Stirring is continued for another three hours at 60° C. Upon removing the nitrobenzene by steam distillation there are obtained 31 parts of a dyestuff containing about 25 percent of bromine.

One part of this dyestuff is dispersed in 6000 parts of water. From this dye-bath 150 parts of triacetylcellulose are dyed for 1 to 2 hours at boiling temperature. There is obtained a clear blue dyeing showing excellent fastness properties. In the same manner there can be dyed fibers consisting of polyesters, polyamides or the copolymerisates mentioned in Example 1. If 150 parts of polyacrylonitrile fibers are dyed from the dye-bath containing 0.2 part of the dyestuff, a light blue dyeing having excellent fastness properties, is obtained.

There is obtained a similar dyestuff if there are used instead of 20 parts of bromine only 10 parts of bromine and subsequently 10 parts of sulfuryl chloride.

*Example 9*

27 parts of 5,8-diamino-1,4-dihydroxy-anthraquinone produced according to the process of German patent specification No. 205,149 and 10 parts of boric acid are dissolved in 250 parts of sulfuric acid (96%). Into this solution chlorine is introduced at 70° C. until a tested example shows a content of 5–7% chlorine. The reaction mixture is then poured onto ice. The precipitate formed is filtered off and washed till neutral. A dyestuff is obtained which dyes polyester fibers in clear blue shades.

*Example 10*

27 parts of 5,8-diamino-1,4-dihydroxy anthraquinone are dissolved in 200 parts of o-dichlorobenzene and treated with 20 parts of sulfuryl chloride. The mixture is heated slowly to 100° C. and stirred for 1 hour at this temperature. The precipitate is filtered off and washed with methanol and water. Thus a dyestuff is obtained containing 12–13% of chlorine.

If there are used 30 parts of sulfuryl chloride a dyestuff having a chlorine content of about 17% is obtained.

Similar dyestuff is obtained if instead of the above anthraquinone there is used 4,5,8-triamino-1-hydroxy-anthraquinone. By using 8-amino-1,4,5-trihydroxy-anthraquinone reddish blue dyestuff are obtained.

I claim:

1. An anthraquinone dyestuff mixture obtained by contacting an anthraquinone corresponding to the following formula

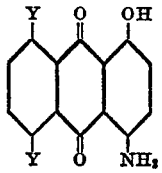

wherein one Y stands for —NH$_2$ and the other Y stands for —OH, with a halogenating agent selected from the group consisting of chlorine, bromine and sulfuryl chloride until the anthraquinone molecules contain an average halogen content between 0.5 and 1.5 mols based on the anthraquinone.

2. The dyestuff mixture of claim 1 wherein the anthraquinone is 4,8-diamino-1,5-dihydroxy anthraquinone.

3. The dyestuff mixture of claim 1 wherein the anthraquinone is 4,5-diamino-1,8-dihydroxy anthraquinone.

4. An anthraquinone dyestuff mixture of claim 1 wherein the halogen content is bromine.

5. An anthraquinone dyestuff mixture of claim 1 wherein the halogen content is chlorine.

References Cited in the file of this patent

UNITED STATES PATENTS 2,757,064     Speck ................ July 31, 1956

OTHER REFERENCES

Yates: Silk Jour. and Rayon World, November 1945, pages 36–37.

Lubs: The Chemistry of Synthetic Dyes and Pigments, Reinhold Pub. Co., N.Y., 1955, pages 417–421, esp. page 417.